Oct. 22, 1929.  H. COOPER  1,732,354
ALIGNMENT COUPLING
Filed March 22, 1923
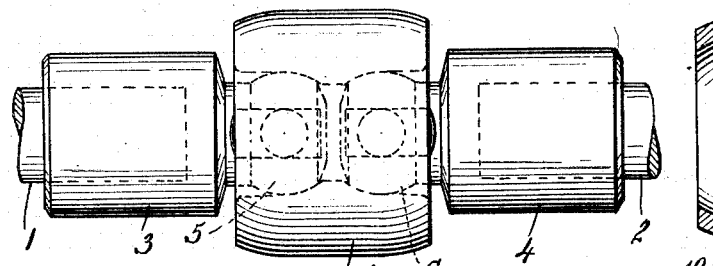
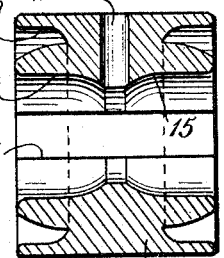
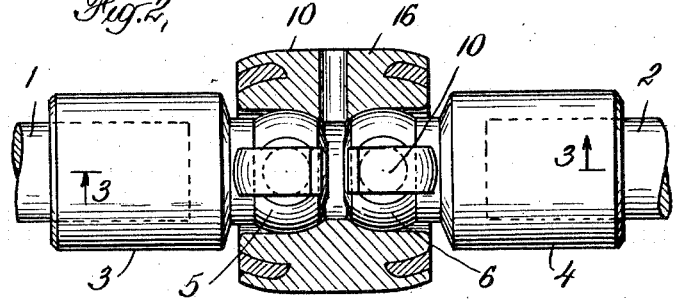
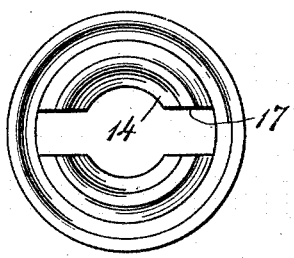
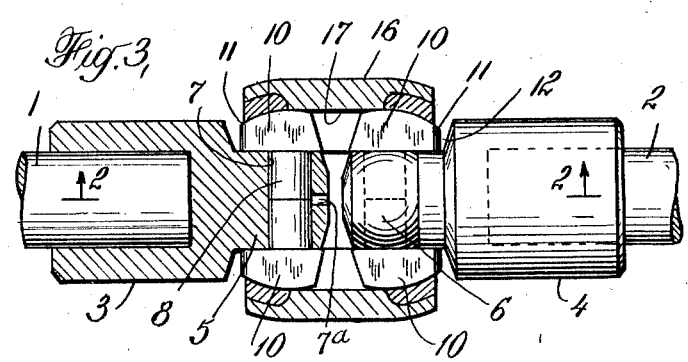
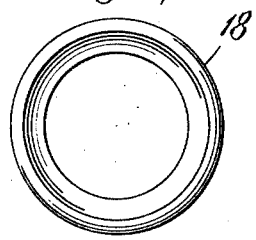
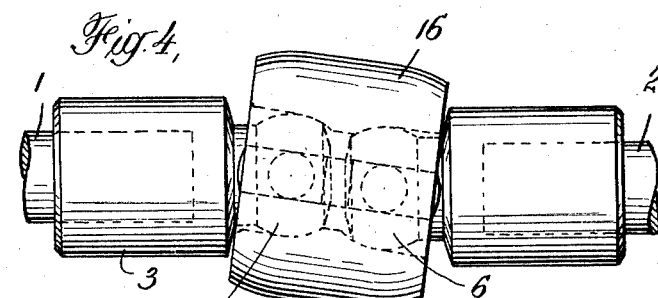
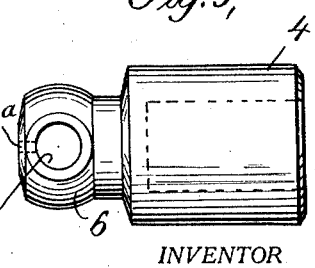
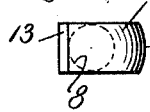
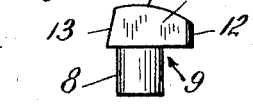
INVENTOR
Herbert Cooper
BY Walter J. Gill
ATTORNEY Patented Oct. 22, 1929

1,732,354

UNITED STATES PATENT OFFICE

HERBERT COOPER, OF BROOKLYN, NEW YORK

ALIGNMENT COUPLING

Application filed March 22, 1923. Serial No. 626,734.

This invention relates to alignment couplings particularly adapted for connecting a driving shaft to a driven shaft in such a manner as to allow for variations in alignment due to lateral or angular displacements of the axes of the shafts with respect to each other during the operation of the machines to which the shafts are connected, or to provide for a permanent lateral or angular displacement of the axis of one shaft with respect to that of the other.

One of the oldest and best known forms of alignment coupling is that commonly called the Oldham coupling. Many subsequent couplings modelled along the lines of the Oldham coupling have been produced. Other attempts have been made to produce couplings of this character by the use of connections of flexible material such as rubber, leather or the like, but these materials deteriorate and must be frequently renewed and even when in good condition they permit only a limited amount of lateral or angular displacement between the shafts.

Another form of flexible coupling consists of two members attached to the shafts and connected by flexible laminated units each consisting of a bundle of flat steel springs held flexibly and radially in keepers lying within holes in the members. The ends of the springs are held in the keepers by means of pins about which the springs may pivot, and one end of each spring is provided with an elongated hole to permit limited endwise movement to allow for longitudinal float of the shafts. Power is transmitted from one shaft to the other through the flexible units which pivot about their pins and bend sidewise to allow for an out of alignment condition of the shafts.

Couplings of this type have several disadvantages. The springs composing the flexible units wear out quickly as a result of the rapid intermittent flexure to which they are subject during operation of the coupling and the tendency to wear becomes greater with higher speeds of the shaft and increased displacements of one shaft with respect to the other so that in practice the speed at which the shafts may be driven is limited. The construction permits only a slight variation both laterally and angularly between the shafts.

It is an object of the present invention to produce an alignment coupling in which power may be transmitted directly through contacting members without the use of any parts formed of flexible material, thereby eliminating all of the disadvantages attending the use of such parts and obtaining a strong, durable and simple coupling which possesses the further advantage of permitting a considerably greater degree of displacement both laterally and angularly between the shafts than is possible to obtain in couplings in which such materials are used.

In accordance with the invention the coupling consists of a member provided with a pair of oppositely disposed sockets within which are ball members attached directly or by intermediate members to the ends of the shafts connected by the coupling. In order that power may be transmitted from the driving shaft to the socket member and from the latter to the driven shaft, each ball member is provided with a pair of drivers movably mounted thereon and fitting within slots in the socket member. Secured to the ends of the socket member are retaining rings which engage the drivers to hold them and the ball members to which they are attached in place in the sockets of the socket member while permitting movement of the ball members and drivers relatively to the socket member and retaining rings, as occurs during rotation of the coupling if the shafts are out of alignment either laterally or angularly or both.

The retaining rings may be permanently attached to the socket member in case it is not necessary to provide an arrangement whereby the coupling may be taken apart.

The particular nature of the invention as well as other objects and advantages thereof will appear more clearly from a description of a preferred embodiment thereof as shown in Figs. 1 to 11 inclusive of the accompanying drawings.

More specifically described,

Fig. 1 is an external view of one form of the coupling with the shafts in alignment.

Fig. 2 is a view of the coupling with parts shown in section along the line 2—2 of Fig. 3,
Fig. 3 is a view with parts in section along the line 3—3 of Fig. 2,
Fig. 4 is a view similar to Fig. 1, but with the shafts out of alignment laterally,
Fig. 5 is a longitudinal sectional view of the socket member of the coupling,
Fig. 6 is an end view of the socket member,
Fig. 7 is a sectional view of one of the retaining rings,
Fig. 8 is an end view of the ring,
Fig. 9 is a view of one of the ball members and the socket for receiving a shaft,
Figs. 10 and 11 are top and side views respectively of one of the drivers of the coupling.

In the embodiment of the invention shown in Figs. 1 to 11 inclusive, 1 and 2 denote the shafts which are connected by the coupling. Attached to the ends of the shafts in any suitable manner are cylindrical members 3 and 4, the ends of which terminate in ball members 5 and 6 flattened on opposite sides, as shown most clearly in Fig. 3. Each ball member is provided between the flat faces with a hole 7 adapted to receive the shank 8 of a driver 9, there being two of these drivers associated with each ball member. A passage 7ª is provided through the end of each ball member for supplying lubricant to the contacting faces of the member and its drivers. Each driver has a head 10 the outer face 11 of which is curved both longitudinally and transversely concentrically with respect to the curved surface of the ball member, but with a greater radius. One end 12 of the head is extended beyond the shank while the other end is bevelled, as at 13.

The two ball members 5 and 6 fit within correspondingly shaped sockets 14 and 15 respectively of a socket member 16 which is provided at diametrically opposite points with longitudinal slots 17 adapted to receive the heads 10 of the drivers, the latter being so positioned that the bevelled ends 13 lie adjacent to each other when the parts have been assembled by placing the two ball members within the socket member with the heads of the drivers lying within the slots 17. When the parts have been thus assembled, a retaining ring 18 is placed within a correspondingly shaped annular channel 19 in each end of the socket member 16. The metal of the socket member is then swaged over the outer faces of the rings to hold them permanently in place. At the points where the rings pass the slots 17 they engage portions of the outer faces 11 of the drivers 9, as shown most clearly in Fig. 3, thus retaining the drivers and the ball members to which their shanks are connected in place in the socket member. The socket member is provided with a radial passage 19' through which lubricant may be supplied to the ball members and drivers of the coupling from an oil cup or other suitable device inserted in the passage.

The rotation of the driving shaft is communicated to the driven shaft through the ball member and drivers of the former, socket member 16 and drivers and ball member of the driven shaft. If the shafts are in alignment, as in Figs. 1, 2 and 3, the center line of the socket member 16 coincides with the center line of the two shafts and the drivers lie in a plane passing through these center lines. If the shafts are not in alignment, as in Fig. 4, the socket member 16 assumes an inclined position by tilting about the ball members, and the drivers turn slightly within the holes in the ball members as they pass through the position shown in this figure. In positions 90° from that indicated the drivers lie in the plane of the center lines of the shafts, that is, in a position like that of Fig. 1 but with the socket member tilted due to shaft 2 being below shaft 1. Since the parts of the coupling between which there is relative movement turn freely with respect to each other during the rotation of the shafts, they will if properly lubricated, run indefinitely without injurious action, such as occurs in the case of flexible coupling of the type in which power is transmitted through metallic members subject to rapid intermittent flexure during the rotation of the shaft. The life of the coupling is thus prolonged, and since it is composed of a relatively small number of parts which may be cheaply produced and easily assembled the cost of manufacture is reduced. The coupling also provides for a uniform speed of the driven shaft, for any variations in speed which would be caused if one half of the coupling were used alone will be compensated by equal and opposite variations in speed caused by the other half of the coupling. By arranging the retaining rings so as to permit longitudinal play of the ball members and drivers within the socket member allowance may be made for endwise floating of the shafts during their rotation.

It is characteristic of the invention that both the permissible inclination of the shafts and their lateral displacement may be considerably greater than in couplings of the type in which members of flexible material are used for giving flexibility between the parts which are connected to the shafts. Furthermore the present coupling may be operated at the limits of lateral or angular displacement of the shafts as satisfactorily as when the shafts have no such displacement. This is not true of the type of coupling having laminated members, for the injurious effect upon the members increases with increasing lateral or angular displacement of the shafts on account of the greater flexure which is imparted to them under such conditions. Couplings of this type are also limited as to the speed at which they may safely be operated due to the injurious effect of the rapid changes in flexure of the laminated members with tendency to become overheated and brittle.

In the coupling of the present invention the parts are subject only to such wearing away of contacting surfaces as occurs in any device having parts movable relatively to each other, and as in the case of such a device, the wear may be reduced to a minimum by properly fitting the parts and adequately lubricating them while in operation.

While a preferred embodiment of the invention has been disclosed herein, it will be understood that it may be embodied in other forms and that various changes in details of construction may be made without departing from the principle of the invention as defined in the appended claim.

I claim:—

In an alignment coupling, a socket member provided at each end with an annular channel and having a pair of oppositely disposed sockets each provided with slots in its wall in longitudinal alignment with the slots of the other socket, ball members lying within the sockets, driving members associated with the ball members and lying within the slots and retaining members within the channels of the socket member and engaging the driving members for holding them and the ball members in the socket member.

In testimony whereof I affix my signature.

HERBERT COOPER.